United States Patent [19]

Sproule

[11] 3,966,351

[45] June 29, 1976

[54] DRAG REDUCTION SYSTEM IN SHROUDED TURBO MACHINE

[76] Inventor: Robert Stanley Sproule, 4731 Connaught Ave., Montreal, Quebec, Canada, H4B 1X5

[22] Filed: May 15, 1974

[21] Appl. No.: 470,150

[52] U.S. Cl. ................................ 415/110; 415/175
[51] Int. Cl.² ................... F01D 25/18; F01D 25/22
[58] Field of Search ............. 415/1, 110, 111, 112, 415/175, DIG. 1, 147; 114/67 A

[56] References Cited
UNITED STATES PATENTS

| | | | |
|---|---|---|---|
| 921,118 | 5/1909 | Kasley | 415/147 |
| 1,032,828 | 7/1912 | Hayton | 415/147 |
| 2,334,625 | 11/1943 | Heppner | 415/147 |
| 3,024,734 | 3/1962 | Dickson et al. | 415/110 |
| 3,236,499 | 2/1966 | Chatfield et al. | 415/112 X |
| 3,239,193 | 3/1966 | Kerensky | 415/110 |
| 3,245,656 | 4/1966 | Desbaillets et al. | 415/112 |
| 3,279,378 | 10/1966 | Sproule | 415/112 |
| 3,398,696 | 8/1968 | Sproule | 415/112 |
| 3,447,782 | 6/1969 | Sproule | 415/112 X |

FOREIGN PATENTS OR APPLICATIONS

| 279 | 10/1910 | United Kingdom | 415/147 |
|---|---|---|---|

Primary Examiner—William L. Freeh
Assistant Examiner—Edward Look

[57] ABSTRACT

A rotary radial flow machine such as a centrifugal compressor for compressing gas, and having an annular shroud encompassing the rotor blades thereof and forming with the surrounding portion of the machine an enclosed restricted access gas containment zone is provided with a gas supply to provide a low-drag gas to the enclosed zone to substantially exclude working gas passing through the compressor from entering the enclosed zone, so as to reduce the drag on the rotor. A shroud seal between the shroud and the surrounding portion of the machine limits the passage of the gas relative to the zone.

3 Claims, 5 Drawing Figures

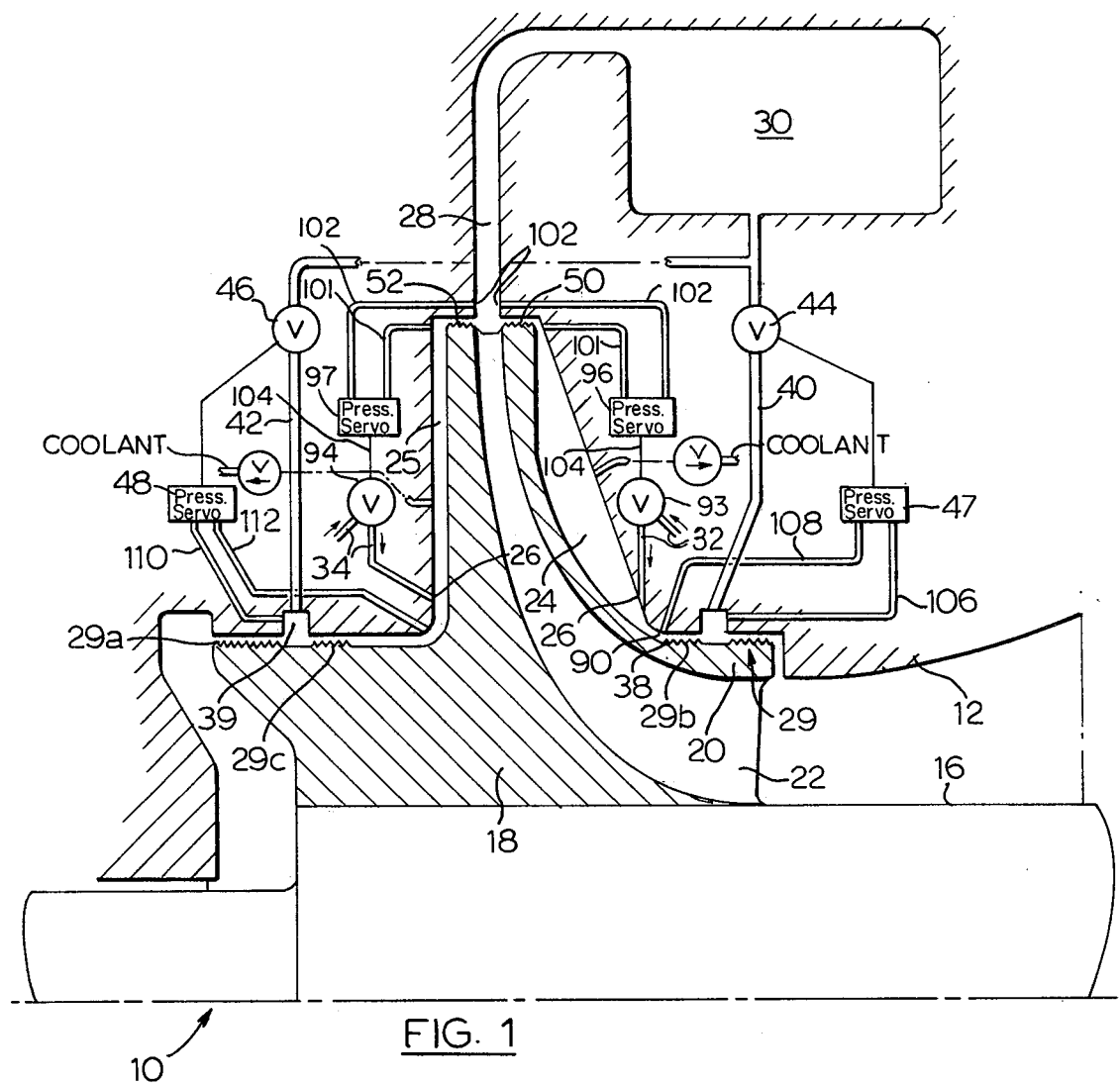
FIG. 1
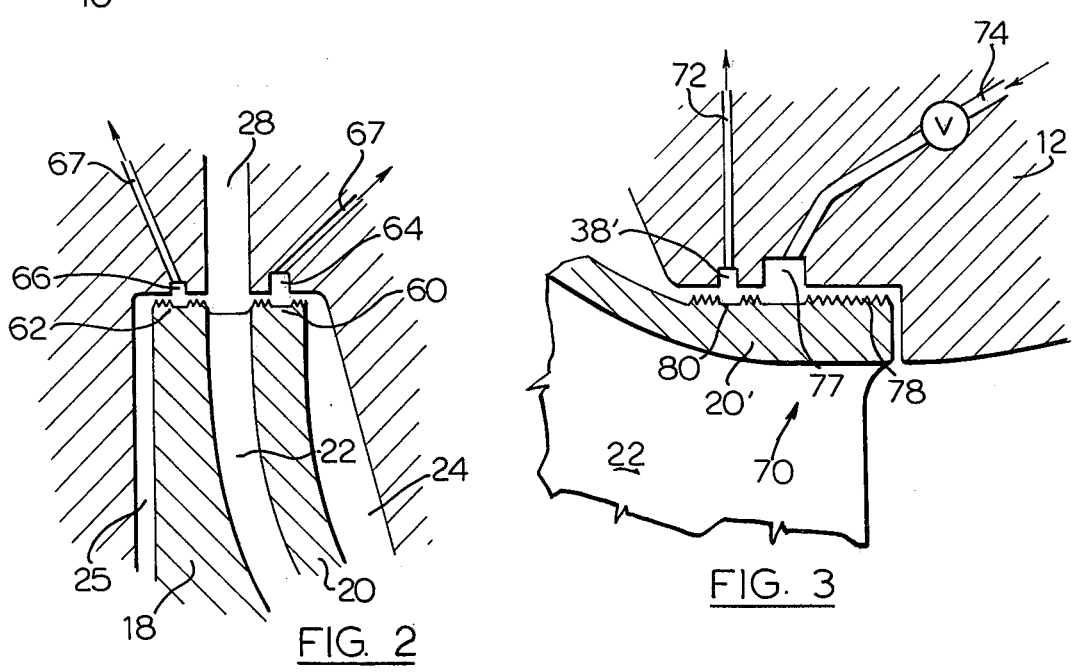
FIG. 2
FIG. 3

DRAG REDUCTION SYSTEM IN SHROUDED TURBO MACHINE

This invention is directed to an improved rotary machine for obtaining a useful change in pressure of a working gas, and in particular to a shrouded centrifugal or centripetal machine such as a compressor or turbine having a reduced drag characteristic, by the provision of means to supply and contain low drag gas about the shroud of the rotor.

In the operation of rotary compressors and turbines the efficiency of the machine is adversely affected by parasitic losses, including surface drag, as distinct from form or profile drag. In the case of a centrifugal machine having a shrouded compressor, the outer exposed or wetted area of the compressor rotor shroud surface which is remote from the compressor blades constitutes a parasitic drag area. The parasitic shroud area is substantially equal to that of the inner or active side of the shroud to which the blades are secured and past which flows the air or other gaseous working fluid being compressed.

The parasitic drag of the shroud outer surface can be reduced in accordance with the present invention so as to thereby effectively boost machine efficiency.

The present invention teaches the substitution of a displacing gaseous fluid in surrounding relation with the compressor outer shroud surface, having a drag coefficient less than that of the working gas, viz, air.

Suitable gaseous fluids for use as displacing gases and having the requisite low drag coefficient are hydrogen and helium. It is well known that hydrogen mixed with air readily forms an explosive mixture. It will be shown that there are many cases where hydrogen can be used as the displacing gas without risk of fire or explosion. Helium is a relatively expensive gas. It will be shown that there are cases where helium can be used as the displacing gas with loss of very little helium.

In the case of a compressor for a natural gas pipeline in which air is not present the hydrogen does not form an explosive mixture with the working gas. Any hydrogen which is lost by mixing with the working gas becomes a useful component of the pipeline product, so that for reasonable rates of hydrogen consumption the cost of providing the hydrogen is little more than the expense of transporting hydrogen to the compressor site.

In the case of a compressor according to the present invention utilized in a natural gas liquifaction plant, owing to the significantly lower boiling point of hydrogen than that of methane, hydrogen gas may be fairly readily recovered in the plant and recycled through the process. Helium may suitably be substituted for hydrogen, and may be found in sufficient quantity as a by-product of the liquifaction process, with certain natural gases.

In an air liquifaction plant, hydrogen may be used as the displacing gas, with special provisions to keep all hydrogen out of the working gas. However, it will normally be safer and more convenient to use helium. Small amounts of gas lost to the working gas can be readily recovered in the liquifaction process.

In an aerodynamic pressure modifying machine of the radial flow type such as a centrifugal compressor suitable for use with a gas turbine, substantial amounts of hydrogen used as the displacing gas in the shroud space may be permitted to enter the air stream from the compressor and will burn with the fuel normally supplied in the gas turbine combustor. An explosive mixture of hydrogen and air will not normally occur in the compressor except in the immediate vicinity where hydrogen is injected into the air stream, and provisions made in accordance with the present invention can prevent ignition in these areas. In the case of an aircraft gas turbine, hydrogen is an economical fuel so there is no unrecoverable expense involved in supplying hydrogen ultimately to the combustion chamber in place of at least some of the normal aircraft gas turbine fuel.

In addition to use within shroud spaces for reduction of drag losses, the selected displacing gas may also be used as a heat transfer gas for cooling the shroud, with associated improvement in compressor performance. When the displacing gas is hydrogen and the compressor is used to compress a combustible gas or as part of a gas turbine, cold hydrogen, possibly even in liquid form may be supplied in substantial quantities through the shroud spaces, where it would tend to raise efficiency both by reducing drag and by cooling the impeller shroud and the diffuser. The gaseous hydrogen could be permitted to flow from the shroud space past the impeller periphery adjacent the compressor discharge, to the diffuser. The presence in substantial quantity of a low molecular weight gas added as a diluent to the working fluid would substantially reduce the effective working capacity of a given compressor, so that only a limited amount of hydrogen may be allowed to enter the working gas in order to maintain machine compressive capacity.

In the case of a machine wherein the replacement or make-up flow of displacing gas is to be held to a minimum, cooling of the contained displacing gas and of the associated shroud enclosure may be effected by use of cooling coils arranged in the wall of the stator housing as a cooling jacket, employed in the usual fashion.

Use of the present invention may also be made with machines having pressure balancing discs, to reduce the windage loss normally entailed in the pressure balancing operation of the rotating disc. In such machines, the creation of unbalanced dynamic axial forces acting longitudinally on the machine rotor is offset by the provision of a disc having a differential fluid pressure acting thereagainst in the desired direction to balance the other axial forces acting on the rotor. The provision of a sealed annular space to receive hydrogen or helium at the desired pressure to achieve balance of axial forces with special arrangements to minimize undesired gas mixing, can effectively reduce the parasitic drag acting on the balancing disc.

While the use of suitable seals can minimize the loss of hydrogen or helium displacing gas from the selected shroud space and limit the ingress of air or other working gas from the compressor working passage into the shroud space, the mixing of the diplacing gas with the working gas may not be totally avoided. However, the present invention permits the control of such mixing to maintain safety.

The following operational characteristics for different modes of practicing the invention are presented by way of example.

The use of hydrogen as displacing gas in an air compressor is made safer by supplying excess hydrogen which flows through the seals, so as to substantially prevent the ingress of air within the shroud space. As an explosive mixture is formed by about 4% by weight (about 40% by volume) of hydrogen with air, it is highly undesirable to permit mixing of hydrogen with air to an extent sufficient to provide a mixture of proportions which, without additional air or hydrogen, will explode or burn. When it is undesirable for the hydrogen displacer gas to mix with the main stream of the air (working gas), a purge annulus or gallery is provided, located axially between two seals adjacent the edge of the shroud.

To maintain a non-explosive mixture in the seal purge galleries of an air compressor in which hydrogen is used as the displacer gas, purge galleries into which the displacer gas passes are kept filled with a strong concentration of either air or hydrogen in order to avoid the creation of an explosive concentration. This can be done by differential control of the related pressures, in the seal zone, namely the air pressure, the pressure in the collector gallery and the pressure of the hydrogen. Excess air (working gas) or hydrogen (displacer gas) is fed through one of the seals into the collector gallery or annulus whence a safely diluted non-explosive mixture of hydrogen and air is bled off. The gas mixture which is bled off may be utilized as fuel locally, as in the combustor of a gas turbine. Alternatively the gas mixture may be wasted or separated into its component parts which may then be re-used. A further arrangement resides in the use of a purge gas, either air or more inert gases or mixtures to expell any hydrogen as it collects in the gallery of the seal.

While the present disclosure is directed primarily to the improvement of compressors, it will be understood that certain benefits of the invention may also be achieved in the case of inward flow centripetal turbines, and outward flow centrifugal turbines.

A further area of potential use is with compressors utilizing a rotary diffuser, wherein compressed gas discharged from a centrifugal rotor or impeller passes radially outwardly through a rotary diffuser, in order to diminish discharge velocity and effect pressure recovery.

While the use of such rotary diffusers is contemplated using mechanical bearings to support the opposed diffuser discs, the use of a low friction gas bearing also is contemplated.

Certain embodiments of the invention are described reference being made to the accompanying drawings wherein FIG. 1 is a schematic illustration in diametrical section showing a half portion of a centrifugal compressor and a seal and pressure control system for the spaces adjoining the compressor shrouds, incorporating the present invention;

FIG. 2 is an enlarged view of the compressor discharge zone incorporating a modified gas seal arrangement;

FIG. 3 is an enlarged view of a seal adjacent the compressor inlet incorporating a further gas seal arrangement;

Figure 4:
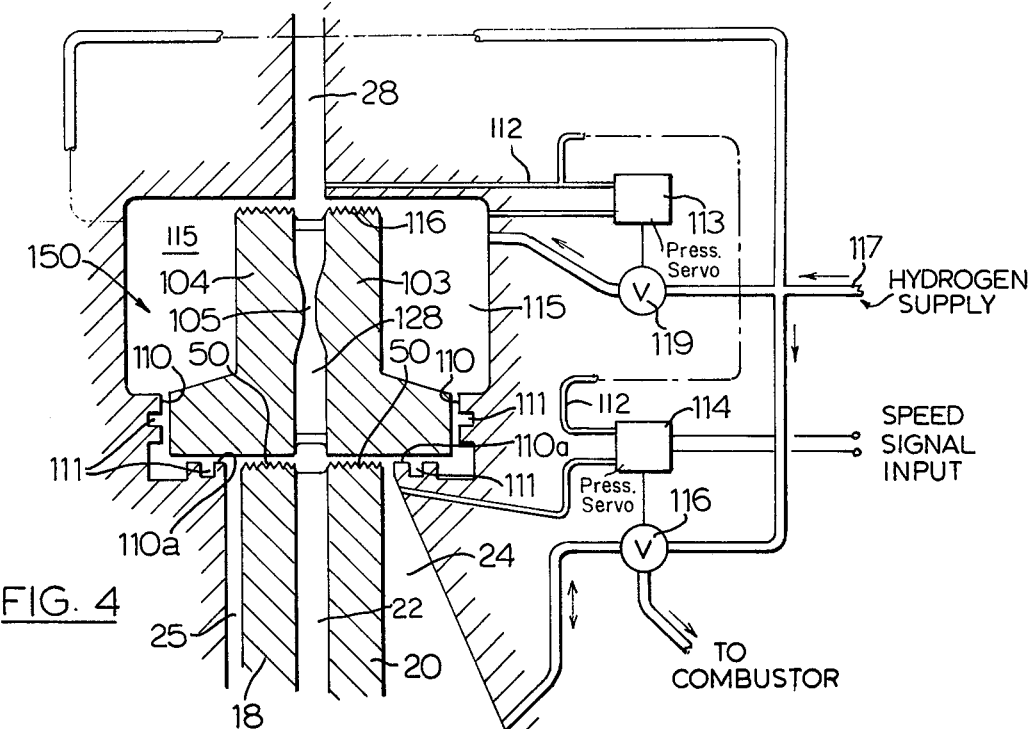
FIG. 4 is a view similar to FIG. 1 for a compressor arrangement incorporating a rotary diffuser.

Referring first to FIG. 1, a compressor 10 has a shaft 16 with an inner downstream or shaft shroud 18 and an outer, upstream shroud 20, with peripherally spaced compressor blades 22 extending between the shrouds 18 and 20. The stationary casing 12 of the compressor forms annular spaces 24, 25 with the respective shrouds 20, 18. The shroud spaces 24, 25 are bounded at their radially outer ends by labyrinth glands 50, 52 forming a close running clearance with the casing 12. A diffuser passage 28 connects to the compressor discharge 30. At the radially inner ends of the shroud spaces 24, 25 labyrinth seals or glands 29 and 29a respectively are provided. Each seal 29 and 29a is adjacent a gas supply gallery 38, 39 respectively, each extending as an annular groove in the casing 12, and connecting by way of ducts 40, 42 and respective throttle valves 44, 46 with the discharge or delivery 30 of the machine. Between the radially inner ends of the shroud spaces 24, 25 and the respective gas supply galleries 38, 39, there are provided anti-mixing seals 29b, 29c respectively.

A gas supply (not shown), of relatively low density displacer gas, such as hydrogen, or helium in some instances, is connected by way of inlet connections 32 and 34 and respective inlet valves 93, 94 to outlets 26 located within the shroud spaces 24, 25.

The gas supply valves 93, 94 are controlled by respective servos 96, 97, each of which has a pressure connection 101 with the respective shroud space 24 and 25, at the radially outer ends thereof; and a connection 102 to the delivery passage or diffuser 28. A slight difference in pressure at the respective pressure sensing connections 101 and 102 is maintained by actuation of the respective servo 96 or 97, the output shafts 104 of which cause adjustment to the related gas supply valves 93 or 94 to adjust the flow of hydrogen or helium displacer gas in a sense to nearly balance the pressures at locations 101, 102. This ensures a limited flow of displacer gas outwardly from the shroud spaces 24, 25 to the discharge 30.

In a like manner the throttle valves 44 and 46 are provided with respective control servos 47 and 48 having pressure connections 106 and 108, and 110, 112 to monitor the pressure difference existing between the respective gas supply galleries 38 and 39 and the adjoining radially inner portion of the respective shroud spaces 24, 25. Thus the rate of admission of the displacer gas is closely controlled within predetermined limits to substantially balance the pressure across seals 50, 52 and the rate of admission of working gas to the gas supply galleries 38, 39 is closely controlled within predetermined limits to prevent substantial flow across anti-mixing seals 29b, 29c.

Referring to the FIG. 2 embodiment, the radially outer ends of the shrouds 20, 18 are each provided respectively with an axially split gland 60, 62 bounding the flow passages between the blades 22 into the diffuser passage 28. Gas collection galleries 64, 66 located between the two halves of each gland 60, 62 collect displacer gas entering from the shroud spaces and air or other working gas entering from the impeller delivery, and bleed this mixture by way of bleed passages 67 to a combustor, not shown. Whilst not shown, it will be understood that non-return valves may be provided as a safety measure to prevent reverse flow from the combustor in the case of this and other illustrated bleed passage embodiments. Such provision is intended where transient pressure surges may arise in the combustor tending to produce reverse bleed flow conditions.

Referring to an arrangement in FIG. 3 as an alternative, from that of FIG. 1, the radially inner seals 20', as at the compressor inlet, are provided with a collector gallery 38' located between the two half seals 80. A working gas supply line 74 controlled by inlet valve 75 admits working gas to a supply gallery 77.

A seal portion labyrinth 78 limits the outflow of working gas, rightwardly as illustrated to the compressor inlet. A mixture of working gas and displacer gas in the collector gallery 38' may be bled to the combustor or elsewhere, as in the FIG. 2 embodiment.

FIG. 4 shows a portion of a machine, illustrating a radially outer portion in diametrical section of the compressor rotor corresponding with that illustrated in FIG. 2 with radially outer portions of blade 22 and shrouds 18 and 20, having an annular rotary diffuser 150 located radially outwardly thereof. The annular diffuser 150 has a passage 128 extending between the compressor discharge and the flow passage 28. The diffuser 150 which comprises halves 103, 104 joined by struts is supported for rotation on bearings, illustrated as being gas bearings 111, positioned between shoulders 110, and on journals 110a.

The gas inlet and gas outlet of the rotary diffuser portion 150 of the machine are provided with seals of the labyrinth type, the radially outer seal 1116 comprising annular serrations on the body portions 103, 104 of the diffuser, with the radially inner seal comprising serrations 50 on the shrouds 18, 20 of the compressor.

In the FIG. 4 embodiment the spaces 115 are provided with displacer gas from supply pipe 117, which is also shown to serve the shroud space 24. Control valves 116 and 119, governed respectively by servo controllers 114, and 113 regulate the supply of the displacer gas, in response to pressure pick-ups such as 112, which connects with the gas delivery passage 28.

Pressure pick-up 112 transmits to the controller 113 the pressure in passage 28 close to the periphery of rotary diffuser 150. The pressure in space 115 may then be set by controller 113 and valve 119 to maintain the desired relationship between the pressures on opposite sides of seal 1116. It is difficult to measure the pressure in the working gas adjacent to seal 50 for the purposes of controlling the pressure in 24, but for a given speed this pressure will bear a constant relationship to the pressure in line 112, so that a line from 112 is connected to controller 114, which in the case of a variable speed compressor, must also be provided with a rotor speed signal input (not shown).

Figure 5:
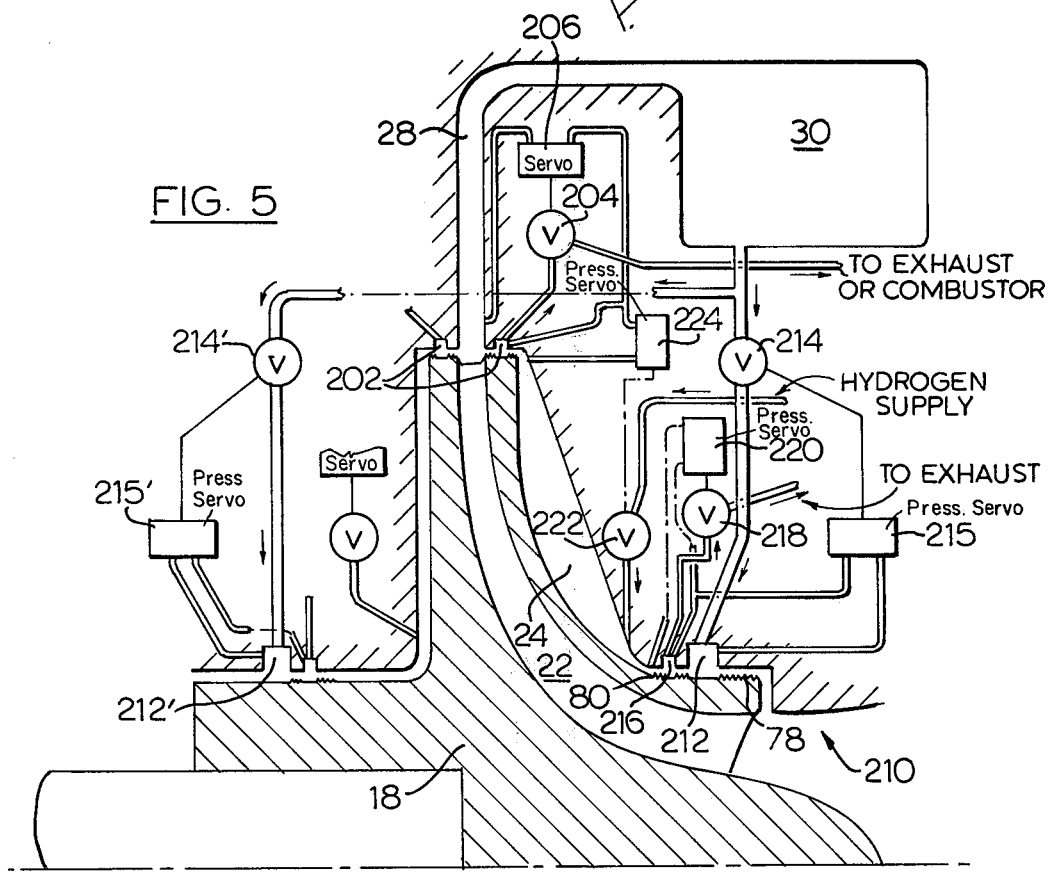
FIG. 5 is a view similar to FIG. 1, illustrating alternative embodiments of gas seals and gas control arrangements therefor.

In the machine embodiment illustrated in FIG. 5, the radially outer seals of the shrouds 18, 20 are provided with collector galleries 202, each having a throttle control valve 204, with a servo controller 206, to regulate the rate of bleed off of displacer gas from the respective gallery 202 to exhaust or to a combustor. At the radially inner seal 210, an upstream supply gallery 212 connects by way of valve 214 to the compressor discharge 30. The throttle valve 214 has a differential pressure servo motor 215, with pressure sensors in the gallery 212 and in a collector gallery 216.

The gas mixture in the collector gallery may be controlled to the point of being either too weak or too rich a mixture to burn by adjusting controllers 206 and 224, in the case of gallery 202, etc.

Adjoining the gallery 212 and downstream therefrom is a collector gallery 216 having a throttle control valve 218 controlled by differential pressure servo 220. Displacer gas is admitted to the annular shroud space 24 by way of inlet control valve 222 which is regulated by differential pressure servo 224. The servo 224 is responsive to pressure differential between the shroud space 24 and the collector gallery 202, by way of pressure sensor pipes connected thereto.

Thus in operation, the FIG. 5 embodiment receives displacer gas at regulated pressure, the outflow of which is minimized by inner and outer seals. The radially inner and outer seals have collector galleries 216 and 202 respectively to purge non-explosive concentrations of displacer gas and working gas from the compressor, assuring minimum contamination of the main bodies of both gases by each other.

Reverting to the FIG. 4 embodiment, the three-way valve 116 illustrated maintains the requisite pressure within shroud space 24, independently of whether or not there is a sufficient inflow of gas to the space 24 from the gas bearings 111.

In the case where a substantially higher hydrogen pressure exists in spaces 115 of the rotary diffuser than in space 24, particularly if hydrogen flow quantities are increased for purposes of cooling, the rate of leakage of hydrogen as a coolant into space 24 is controlled by valve 116, which in this instance may be a single two-way valve, rather than the three-way embodiment illustrated.

The rate of flow of the hydrogen gas is influenced by the function of the gas bearings 111.

Excess hydrogen used as a coolant with an admixture of air from the gallery 212, is evacuated through collection gallery 216 to waste, or to a combustor for use as fuel therein.

The control of the respective pressure regulators 113 and 114 of FIG. 4 for the diffuser shroud space 115 and the rotor shroud space 24 is such that the pressure in space 115 is substantially higher than that of space 24, corresponding to the pressure rise through the diffuser passage 128. In the absence of a complicated seal for the gas bearings 111 there is a considerable flow of hydrogen in cooling relation from the space 115 radially inwardly to the space 24, where it is collected in appropriate collector gallery 38' of FIG. 3, or allowed to escape through seal 50 of FIG. 4.

Referring to the FIG. 5 embodiment, the gas pressure in gallery 202 is regulated by controller 206 at a value slightly less than compressor delivery pressure in passage 28, to minimize the escape of air from compressor delivery 28 into annular shroud space 24. The controller 224 maintains shroud pressure in space 24 substantially the same as delivery pressure in passage 28 so that there is minimal flow of displacer gas (such as hydrogen) to the collector gallery 202, and thence by way of control 204 to exhaust or to a combustor (not shown). The controller 220 is set to maintain a slight drop of pressure from space 24 to the collector gallery 216, to permit a slight flow of displacer gas (usually hydrogen) through the gallery 216 and by way of control valve 218 to exhaust or the combustor (not shown).

The controller 215 is set to maintain a slightly higher pressure in the supply gallery 212 than in the collector gallery 216, so that there is a controlled flow of air or other gas from the compressor delivery 30 by way of valve 214 to the gallery 212 and thence to the collector gallery 216.

The pressure drop between the supply gallery 212 and the compressor inlet is substantially equal to the full piezometric pressure rise across the compressor rotor, between its inlet and its outlet at 28.

The respective controllers are carefully regulated to ensure that at no time is there an explosive mixture within the vicinity of the compressor.

What I claim as new and desire to secure by Letters Patent of the United States is:

1. A rotary machine to effect a useful energy exchange by changes in pressure of a working gas passing through the machine, comprising a rotor rotatably mounted in a housing having passages therethrough arranged in flow connecting relation with passages extending through the rotor for the passage of said working gas in energy exchanging relation with the machine rotor, said rotor comprising a rotatable shroud having blade members extending from a radially inner surface of the shroud, the shroud having a first, radially inner boundary and second, radially outer boundary defining an annular surface therebetween, a first gas seal means adjacent said first boundary and a second gas seal means adjacent said second boundary to substantially isolate an annular zone surrounding the shroud, displacer gas supply means connected to the zone to provide low density displacer gas thereto, selected from the group consisting of hydrogen and helium, to reduce parasitic gas drag acting on the shroud, a gas annulus within the zone located adjacent the first seal means having gas supply means connected thereto including inlet flow control valve means to regulate the gas supply, a gas collection gallery within the zone adjacent said second seal to collect said displacer gas together with gas entering through said second seal and gas exhaust passage means connected to said gallery having an exhaust flow control valve connected therewith to regulate the passage of gas including said displacer gas from said zone.

2. The machine as claimed in claim 1 including a gas collector groove within said annular zone on the side of said gas annulus remote from said first seal means, to collect therein a mixture of displacer gas and gas from said annulus, a gas exhaust connection from said collector groove and flow control means to control the rate of exhaust of the gas mixture, including pressure sensing means responsive to differences in gas pressure between the interior of said annular zone and said collector groove, and between said collector groove and said gas supply annulus, to limit the mixing of gases within the machine.

3. The machine as claimed in claim 1 including differential pressure sensor means connected in controlling relation with said exhaust flow control valve, displacer gas supply means connected with said gas supply annulus by way of a supply valve means to provide displacer gas to said gas supply annulus to control the flow of displacer gas to said annular zone surrounding said shroud.

* * * * *